3,358,043
NEW HALOGENATED BISPHENOLS
Richard B. Lund, Whippany, John Vitrone, Parsippany-Troy Hills Township, Morris County, and Logan C. Bostian, Morris Township, Morris County, N.J., assignors to Allied Chemical Corporation, New York, N.Y., a corporation of New York
No Drawing. Filed Oct. 4, 1962, Ser. No. 228,227
4 Claims. (Cl. 260—619)

This invention relates to new halogenated bisphenols and, more particularly, refers to halogenated derivatives of 1,3-bis(p-hydroxycumyl)benzene and 1,4-bis (p-hydroxycumyl)benzene and to a process for their preparation.

Compounds possessing two phenolic groups are commonly referred to as bisphenols and are generally utilized as intermediates in the preparation of polycarbonates and epoxide resins. Conventional processes for the preparation of these resinous materials frequently utilize an aqueous alkaline reaction medium containing the desired bisphenol. However, substantial or complete insolubility of the bisphenols in the aqueous alkaline solution usually necessitates use of co-solvents or solubility promoters in order to effect reaction. This obviously adds to the cost of manufacture.

A principal object of the present invention is to provide new and useful 1,3-bis(halo-p-hydroxycumyl)benzene and 1,4-bis(halo-p-hydroxycumyl)benzene. Another object is to provide a process for producing 1,3-bis(halo-p-hydroxycumyl)benzene and 1,4 - bis(halo-p-hydroxycumyl)benzene in yield of at least 80 percent theoretical. Other objects and advantages of the present invention will be apparent from the following description.

These halogenated bisphenols are usually white solids and may be chemically described by the following formulas:

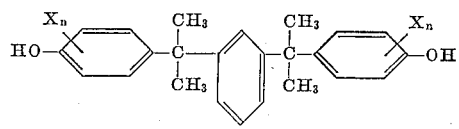

1,3-bis(halo-p-hydroxycumyl)benzene and

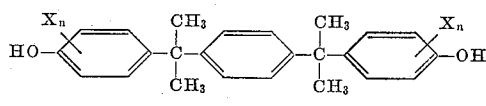

1,4-bis(halo-p-hydroxycumyl)benzene wherein X is a halogen selected from the group consisting of chlorine and bromine and $n$ is an integer from 1 to 4.

Co-pending application of Bostian et al., Ser. No. 228,789, filed of even date, discloses and claims the corresponding polycarbonates and a process for their preparation.

Briefly, these new halogenated bisphenols are produced by preparing a reaction mixture containing 1,3-bis(p-hydroxycumyl)benzene or 1,4-bis(p-hydroxycumyl)benzene as dissolved or suspended material in an inert organic solvent and thereafter introducing into said reaction mixture a halogen selected from the group consisting of chlorine and bromine and recovering the resulting 1,3-bis-(halo-p-hydroxycumyl)benzene or 1,4 - bis(halo-p-hydroxycumyl)benzene.

Co-pending application of Broderick et al., Ser. No. 140,221, filed Sept. 25, 1961, discloses and claims 1,3-bis-(p-hydroxycumyl)benzene and 1,4-bis(p-hydroxycumyl)-benzene and a process for their preparation.

The molar ratio of the reactants is not critical but is dependent upon the degree of halogen saturation desired. Thus, if mono substitution of the hydroxyphenyl moieties of 1,3-bis(p-hydroxycumyl)benzene or 1,4-bis(p-hydroxycumyl)benzene is desired, a molar ratio of 1 mol halogen per mol of 1,3-bis(p-hydroxycumyl)benzene or 1,4-bis(p-hydroxycumyl)benzene is employed. If di-halogen substitution is to be obtained, a molar ratio of about 2 mols per mol 1,3-bis(p-hydroxycumyl)benzene or 1,4-bis(p-hydroxycumyl)benzene is utilized. In order to secure complete saturation of the hydroxyphenyl radicals, it is necessary to use at least about 4 mols halogen per mol 1,3-bis(p - hydroxycumyl)benzene or 1,4 - bis(p - hydroxycumyl)benzene. In this latter instance, complete saturation is usually secured by the employment of extreme reaction conditions such as elevated temperature and superatmospheric pressure over a prolonged reaction period. However, these strenuous conditions may be eliminated by employing a conventional halogenation catalyst such as iron filing, aluminum oxide and the like. Accordingly, the amount of halogen employed may vary from about 0.5 mol to about 6 mols halogen per mol 1,3-bis(p-hydroxycumyl)benzene or 1,4 - bis(p-hydroxycumyl)benzene, a lesser amount producing inefficient yields of halogenated bisphenol while an excess amount is merely left unconsumed and tends to make the reaction uneconomical.

The halogen employed is selected from the group consisting of chlorine and bromine. Although any compound which produces chlorine or bromine under the conditions of reaction may be employed, in preferred operation, chlorine is utilized in its gaseous state while bromine is conveniently introduced in the form of a solution, for example as in chloroform.

The solvent used should be inert under the conditions of reaction, able to dissolve the resulting halogenated bisphenol and allow for reaction at elevated temperature, if desired. Suitable solvents include chlorinated aliphatic hydrocarbons such as methylene chloride, ethylene chloride, chloroform and the like. The amount of solvent employed may vary over a wide range but it is generally employed in the amount, by weight, from about 1 to 20 weight parts solvent per part halogenated bisphenol formed.

Reaction may be carried out at temperatures within the range of from about —20° to about 120° C. and preferably from about 15° to 40° C. Since the reaction is exothermic in nature, the desired temperature may be maintained by simply regulating the rate of introduction of halogen reactant. By such introductory regulation the necessity of employing heat dissipating apparatus is minimized and, in some instances, completely eliminated.

Generally, if the preferred temperature range is utilized, reaction time from about 0.5 to about 4 hours has been found to produce optimum yields, i.e. in excess of 80 percent theoretical, with reaction time from about 1.25 to 2 hours being preferred. It is understood, of course, that the selected reaction temperature may vary with the corresponding change in reaction time and/or pressure.

In preferred operation, 1,3-bis(p-hydroxycumyl) benzene or 1,4-bis(p-hydroxycumyl)benzene in solvent is added to a suitable reaction vessel. The halogen, if in gaseous form, is then introduced at a controlled rate so as to regulate the exothermic heat-of-reaction and, in turn, the desired reaction temperature, i.e. 15° to 40° C. Isolation of the resulting 1,3-bis(halo-p-hydroxycumyl)benzene or 1,4 - bis(halo-p-hydroxycumyl)benzene is effected by conventional procedures such as removal of solvent and liquid impurities by vacuum distillation. For highest purity, the crude 1,3-bis(halo-p-hydroxycumyl)benzene or 1,4-bis(halo-p-hydroxycumyl)benzene is dissolved in a suitable solvent such as cyclohexane, isopropanol, benzene, toluene, ethylene dichloride or mixtures thereof, heated with a decolorizing agent such as carbon, recrystallized, filtered, cooled and dried.

The resulting halogenated bisphenols are soluble in methanol and acetone and partially soluble in cyclohexane while the corresponding non-halogenated bisphenols exhibit only slight solubility in methanol and acetone and are insoluble in cyclohexane. Substantial increased solubility of the halogenated bisphenols of the present invention is also exhibited in dilute aqueous alkali hydroxide solutions. For example, in a 5 percent by weight aqueous sodium hydroxide solution 1,3-bis(3,5-dichloro-p-hydroxycumyl)benzene exhibits a solubility in excess of 20 percent by weight as compared to about 0.6 percent exhibited by its unhalogenated counter part. In the case of 1,4-bis(3,5-dichloro-p-hydroxycumyl)benzene, a solubility in excess of 10 percent by weight is secured in dilute solutions of sodium hydroxide, whereas the 1,4-bis-(p-hydroxycumyl)benzene possesses little or no solubility. In this latter instance, it has been found that upon prolonged standing a material, postulated to be the disodium salt derivative, precipitates out of solution. It is, therefore, advisable in the preparation of polycarbonate resins that the dilute aqueous sodium hydroxide solution containing 1,4-bis(3,5-dichloro-p-hydroxycumyl)benzene be prepared just prior to phosgenation.

The following examples are given for the purpose of illustration. In the examples, parts are by weight.

EXAMPLE 1

To a reaction vessel equipped with a reflux condenser, gas inlet tube, thermometer, mechanical stirrer and cooled by an ice bath, 200 parts of 1,3-bis(p-hydroxycumyl)benzene were added to 1775 parts of chloroform. After solution was effected by warming, the entire reaction mixture was cooled to 15° C. Gaseous chlorine was then passed into the reaction mixture at a controlled introductory rate in order to maintain reaction temperature between 15° and 25° C. Reaction was complete after 75 minutes. 1,3 - bis(3,5-dichloro-p-hydroxycumyl)benzene was isolated by removal of the solvent by distillation, followed by purification by redissolving the crude residue in cyclohexane, heating with decolorizing carbon, filtration and cooling. 230 parts of the 1,3-bis(3,5-dichloro-p-hydroxycumyl)benzene corresponding to a yield of 83 percent of theoretical was obtained as a light yellow solid having a melting point of 137° to 138° C. Further recrystallization produced a completely white crystalline solid in a yield of 80 percent of theoretical. Elemental analysis showed 59.5 percent carbon and 4.63 percent hydrogen as compared to a theoretical of 59.5 percent carbon and 4.5 percent hydrogen. Further analysis showed 29.74 percent chlorine and 7.01 percent hydroxyl group as compared to the theoretical of 29.3 percent chlorine and 7.02 percent hydroxyl.

EXAMPLE 2

To the reaction vessel employed in Example 1 was added a reaction mixture consisting of 450 parts 1,3-bis-(p-hydroxycumyl)benzene and 3250 parts of chloroform. The reaction mixture was then cooled to 10° C. and a total of 392 parts of chlorine were introduced into the reaction mixture over a period of 1.5 hours while maintaining reaction temperature between 10° and 20° C. Hydrogen chloride by-product was removed by heating the reaction mixture to about 30° C. under vacuum, followed by removal of about 2210 parts of chloroform by distillation. 390 parts of cyclohexane were added and the remainder of the chloroform was removed by fractional distillation. Upon cooling, crude 1,3-bis(dichloro-p-hydroxycumyl)benzene separated as a white solid and was isolated by filtration. A total yield of 589 parts 1,3-bis(3,5-dichloro-p-hydroxycumyl)benzene corresponding to a yield of 94 percent of theoretical was obtained. Recrystallization from cyclohexane yielded white crystals having a melting point of 137° to 138° C.

EXAMPLE 3

To the reaction vessel of Example 1, 100 parts of 1,4-bis(p-hydroxycumyl)benzene were admixed with 1330 parts of chloroform and heated to a temperature of 30° C. Chlorine was introduced at a controlled rate so as to maintain reaction temperature between 30° to 35° C. over a period of 2 hours. After the reaction was complete all but about 145 parts of chloroform was removed by distillation, cyclohexane was added, and the mixture was distilled again to remove the remaining chloroform and then cooled. 140 parts of 1,4-bis(3,5-dichloro-p-hydroxycumyl)benzene separated as light yellow crystals from the cyclohexane and were isolated by filtration. Two recrystallizations from a mixture consisting of cyclohexane-isopropanol with decolorizing carbon yielded 117 parts of 1,4 - bis(3,5 - dichloro-p-hydroxycumyl)benzene, corresponding to a yield of 84 percent of theoretical, in the form of colorless crystals having a melting point of 169° to 170° C. Elemental analysis showed 59.47 percent carbon, 4.68 percent hydrogen and 29.59 percent chlorine as compared to the theoretical of 59.5 percent carbon, 4.5 percent hydrogen and 29.3 percent chlorine.

EXAMPLE 4

A reaction mixture of 359 parts 1,4-bis(p-hydroxycumyl)benzene and 3560 parts of chloroform were heated to a temperature of 60° C. and then cooled to 10° C. 300 parts of chlorine were introduced into the reaction mixture with stirring and the reaction temperature was maintained between 10° and 20° C. over a period of 1.5 hours. The reaction mixture was then filtered and 2680 parts of chloroform were removed by distillation. Removal of the remaining chloroform by fractional distillation was effected by the addition of 390 parts of isopropanol. The resultant crude 1,4-bis(3,5-dichloro-p-hydroxycumyl)benzene was heated with decolorizing carbon, filtered and cooled. 490 parts of 1,4-bis(3,5-dichloro-p-hydroxycumyl)benzene, corresponding to a yield of 98 percent of theoretical, was obtained as a white solid and recrystallized from ethylene dichloride to produce white crystals having a melting point of 169° to 170° C.

EXAMPLE 5

The reaction vessel of Example 1 was charged with 6.8 parts of 1,4-bis(p-hydroxycumyl)benzene and 255 parts of chloroform and was stirred until solution was effected. The reaction temperature was maintained from about 30° to 35° C. and a solution consisting of 13 parts bromine in 75 parts of chloroform was added dropwise over a two hour period with constant agitation. The resulting mixture was agitated for an additional hour, followed by boiling of the mixture for 15 minutes in order to remove excess bromine and any hydrobromic acid formed. The reaction mixture was cooled to 10° C. whereupon 1,4 - bis(dibromo-p-hydroxycumyl)benzene precipitated out as white crystals. Isolation of the reaction product was effected by filtration followed by drying. 12 parts of 1,4-bis(3,5-dibromo-p-hydroxycumyl)benzene, corresponding to a yield of 95 percent theoretical, and having a melting point of 201° to 216° C. were obtained. Further purification by two re-crystallizations from chloroform yielded 1,4-bis(3,5-dibromo-p-hydroxycumyl)benzene as white crystals having a melting point from 207° to 209° C.

Elemental analysis showed 43.37 percent carbon, 3.40 percent hydrogen and 5.8 percent phenolic hydroxide group as compared to the theoretical analysis of 43.5 percent carbon, 3.3 percent hydrogen and 5.13 percent phenolic hydroxide. The calculated bromine content was about 48.05 percent as compared to 48.3 percent theoretical.

Although certain preferred embodiments of the invention have been disclosed for purpose of illustration, it will be evident that various changes and modifications may be made therein without departing from the scope and spirit of the invention.

We claim:
1. A halogenated bisphenol selected from the group consisting of

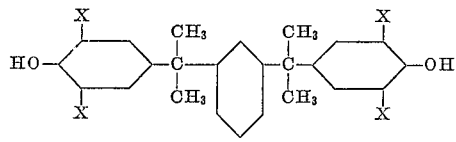

and

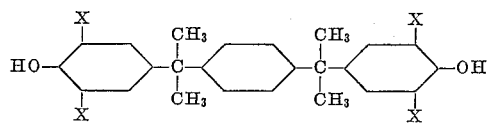

wherein X is a halogen selected from the group consisting of chlorine and bromine.

2. 1,3 - bis(3,5-dichloro-p-hydroxycumyl)benzene.
3. 1,4 - bis(3,5-dichloro-p-hydroxycumyl)benzene.
4. 1,4 - bis(3,5-dibromo-p-hydroxycumyl)benzene.

References Cited
UNITED STATES PATENTS
2,634,297   4/1953   Moyle _____ 260—619
3,251,805   5/1966   Schnell et al. _____ 260—47

FOREIGN PATENTS
1,293,289   4/1962   France.

LEON ZITVER, Primary Examiner.
HAROLD G. MOORE, Examiner.
D. HELFER, H. ROBERTS, Assistant Examiners.